United States Patent

Fasse et al.

[11] Patent Number: 5,893,428
[45] Date of Patent: Apr. 13, 1999

[54] HYDRAULIC POWER STEERING

[75] Inventors: Ernst-Heinrich Fasse, Schorndorf; Bernd Langkamp, Stuttgart-Uhlbach; Arno Röhringer, Ditzingen; Bernd Schick, Winterbach, all of Germany

[73] Assignee: Daimler-Benz AG, Stuttgart, Germany

[21] Appl. No.: 08/847,541

[22] Filed: May 1, 1997

[30] Foreign Application Priority Data

May 2, 1996 [DE] Germany ............... 196 17 566

[51] Int. Cl.$^6$ .................................. B62D 5/06
[52] U.S. Cl. ............... 180/403; 180/417; 91/31; 91/DIG. 2
[58] Field of Search ............... 180/417, 421, 180/441, 442, 403; 91/DIG. 2, 451, 468, 449, 31

[56] References Cited

U.S. PATENT DOCUMENTS

| 4,549,468 | 10/1985 | Trintignac et al. ............... 91/361 |
| 4,664,210 | 5/1987 | Yamaoka et al. ............... 180/132 |
| 4,917,001 | 4/1990 | Yoshikawa et al. ............... 91/447 |
| 5,147,007 | 9/1992 | Kahrs et al. ............... 180/132 |
| 5,184,691 | 2/1993 | Leutner ............... 180/132 |

FOREIGN PATENT DOCUMENTS

| 0 085 383 | 8/1983 | European Pat. Off. . |
| 41 06 310 | 8/1991 | Germany . |
| 92 05 781 U | 7/1992 | Germany . |

Primary Examiner—Anne Marie Boehler
Assistant Examiner—Michael Cuff
Attorney, Agent, or Firm—Klaus J. Bach

[57] ABSTRACT

In a hydraulic power steering for a motor vehicle with a hydraulic servomotor and a servovalve arrangement in communication with opposite servomotor actuating chambers by way of separate communication conduits through which the actuating chambers can be pressurized or depressurized for the operation of the servomotor depending on a force applied by an operator to a steering means, the communication conduits include valve arrangements permitting, when they are open, the release of hydraulic fluid from the actuating chambers but blocking the release of hydraulic fluid when they are closed thereby hydraulically locking the power steering.

7 Claims, 2 Drawing Sheets

HYDRAULIC POWER STEERING

The invention relates to a hydraulic motor vehicle power steering with a double-acting hydraulic servo motor, particularly a double-acting cylinder piston unit and a servo valve arrangement providing for communication with the opposite sides of the hydraulic servo motor by way of separate conduits. By way of the servo valve arrangement and the separate conduits leading to the opposite sides of the hydraulic servo-motor a controllable pressure difference can be generated between the opposite sides of the servo-motor by connecting one of the conduits to a pressurized fluid supply and the other to a low pressure line. The servo valve arrangement includes a valve structure disposed between the servo-motor and the servo valve which can be closed under certain vehicle operating conditions and which, when open, provides for communication between one side of the hydraulic servo-motor and the servo valve for the release of hydraulic fluid.

Hydraulic power steerings are well known and are installed in practically all motor vehicles with the exception of very light motor vehicles.

At present, hydraulic power steerings generally have a direct mechanical coupling between the steered vehicle wheels and the steering wheel operated by the driver or another steering means. Certain elements of the mechanical coupling structure can be locked by a steering lock in order to prevent the theft a parked vehicle.

DE U 92 05 781 discloses an electro-hydraulic control arrangement provided especially for steering additionally steerable rear wheels of a motor vehicle whose front wheels are steered by the vehicle operator in the conventional manner. By the evaluation of certain parameters the control arrangement for steering the rear vehicle wheels can operate independently and can improve the handling capabilities for the vehicle under critical driving conditions. If an error occurs in the electronic system components of the control arrangement, the hydraulic control mechanism for steering the rear vehicle wheels can be hydraulically blocked. Then the vehicle operates like a conventional vehicle in which only the front wheels are steerable.

DE 41 06 310 A1 discloses a vehicle steering system with a hydraulic servo motor which is used at the same time as a steering damper. To this end, the hydraulic conduits between the servo valve and the servo motor include damping valve arrangements consisting each of a throttle structure and, arranged parallel thereto, a check valve and an excess pressure relief valve. The check valve can open only for hydraulic fluid flow in the direction toward the servo-motor and the excess pressure relief valve is adapted to open only for hydraulic fluid flow in the direction toward the servo valve.

It is the object of the present invention to provide for a hydraulic power steering system an advantageous theft-preventing security locking arrangement.

SUMMARY OF THE INVENTION

In a hydraulic power steering for a motor vehicle with a hydraulic servo-motor and a servo valve arrangement in communication with opposite servo motor actuating chambers by way of separate communication conduits via which the actuating chambers can be pressurized or depressurized for the operation of the servo-motor depending on the force applied by an operator to a steering means, the communication conduits include valve arrangements permitting, when they are open, the release of hydraulic fluid from the actuating chambers but blocking the release of hydraulic fluid when they are closed thereby hydraulically locking the power steering.

With the present invention, the conventional mechanical locking mechanism of a power steering system for parked vehicles is replaced by a hydraulic locking arrangement. A mechanical lock becomes effective only when the mechanical locking components are engaged with one another which occurs only at certain steering wheel positions. With the hydraulic locking arrangement according to the invention the steering locking arrangement for the vehicle wheels becomes immediately effective when the respective valve is closed.

Furthermore, the arrangement according to the invention has the advantage that no essential changes are necessary for the theft protection system for use with steering systems without mechanical coupling between the steering wheel and the steered vehicle wheels.

The valve for the hydraulic locking arrangement may be electrically operable and may cooperate with an electronic start up lock for the wheels.

In a preferred embodiment of the invention, there are on both sides of the servo-motor between the servo-motor and the servo valve, controllable throttle valves so that a parameter-dependent controllable dampening of the steering movements can be achieved.

This dampening control is an important feature of the present invention in addition to the steering system locking feature.

It is particularly advantageous if the controllable throttle valves can be fully closed so that, on one hand, in their throttling states, they can act together with the servo-motor as steering damper and on the other hand, the steering mechanism can be hydraulically locked by fully closing the throttle valves.

Preferred features of the invention will be described below on the basis of the accompanying drawings.

DESCRIPTION OF A PREFERRED EMBODIMENT

Figure 1:
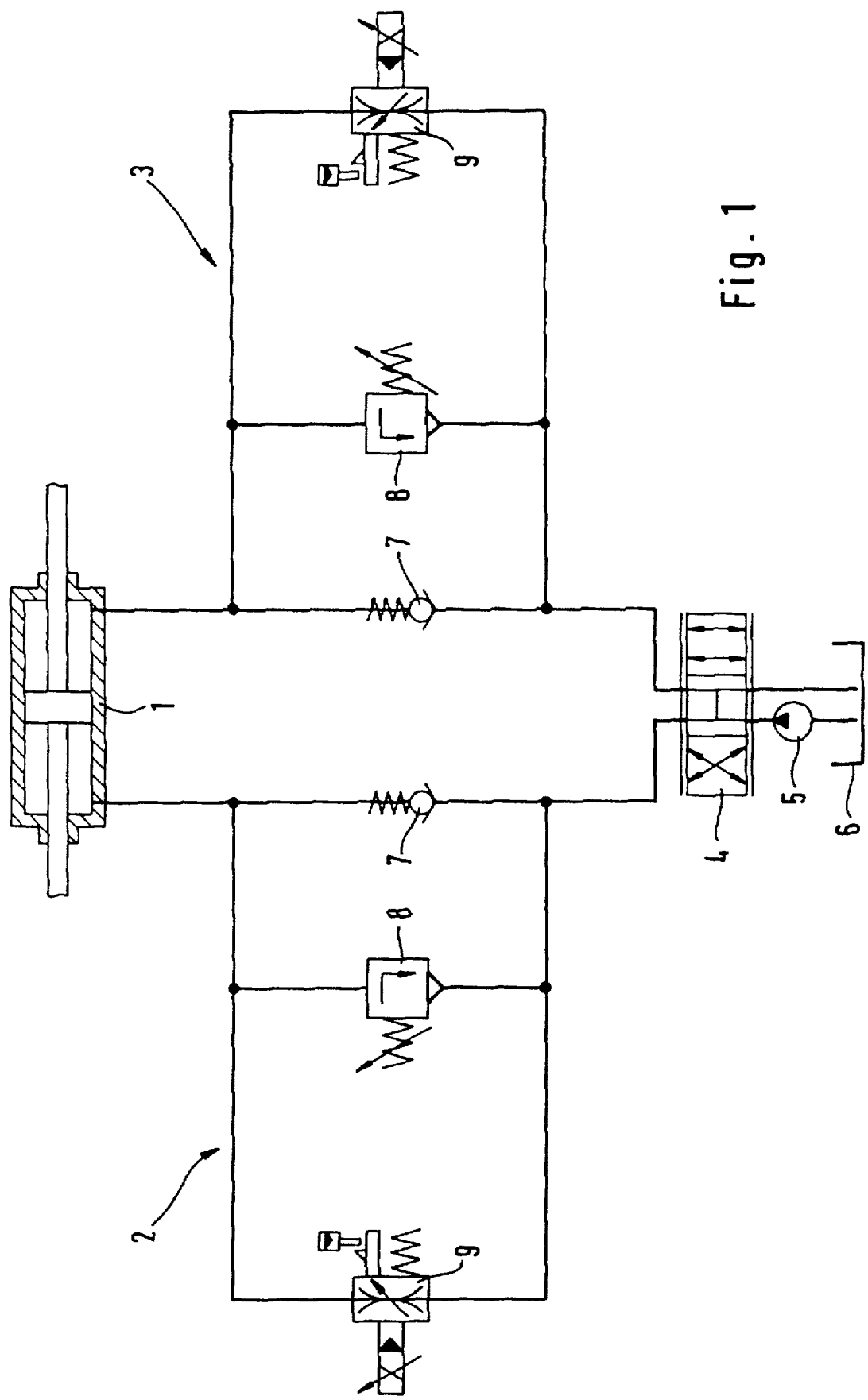
FIG. 1 shows schematically a hydraulic power steering operating system.

As shown in FIG. 1, the power steering according to the invention comprises a servo-motor consisting of a double-acting piston cylinder unit 1 with which the steered vehicle wheels which are not shown, are mechanically coupled in a well known manner. There are hydraulic actuating chambers at opposite ends of the piston cylinder unit 1 and each is in communication, by way of conduit systems 2, and respectively 3, with a different motor connection of a servo valve 4. The servo valve 4 includes also a high pressure fluid inlet which is connected to the pressure side of a hydraulic pump 5 and a fluid outlet in communication with a hydraulic fluid reservoir 6 with which also the suction side of the hydraulic pump 5 is in communication.

Each conduit system 2 and 3 includes a conduit section with a check valve 7 which permits fluid flow only from the respective motor connection of the servo valve 4 to the respective side of the piston cylinder unit 1. Each conduit system 2, 3 includes, parallel to the check valve 7, a pressure limiting valve 8, and, in another parallel path, a controllable throttle valve 9.

Figure 2:
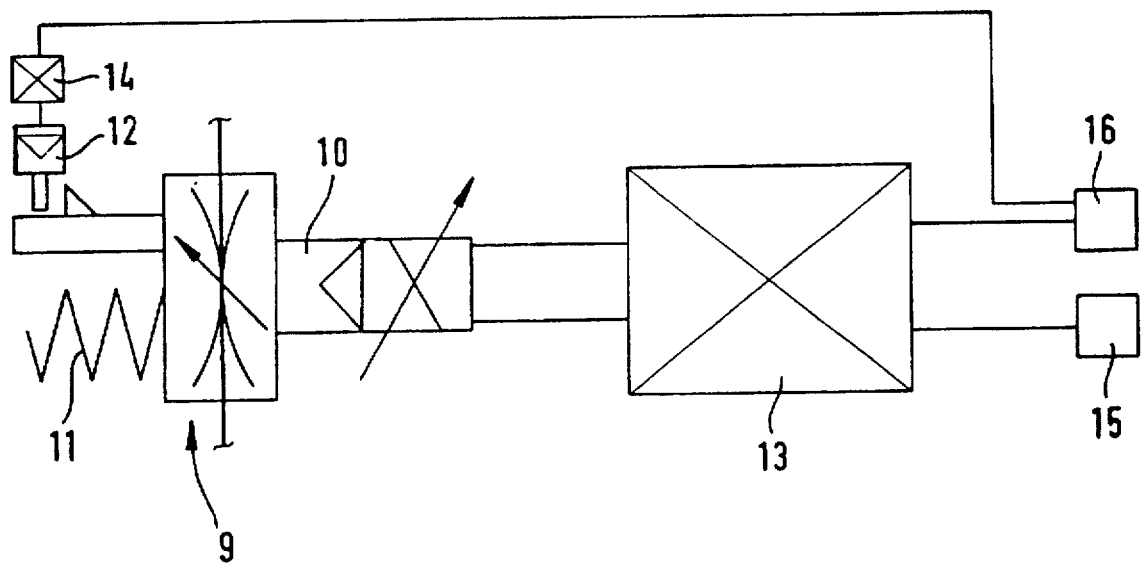
FIG. 2 shows an advantageous embodiment for controlling a lockable throttle valve.

As shown in FIG. 2, the throttle valves 9 include electromagnetic control members 10 which can direct the respective throttle valve 9, against the force of a return spring 11, into a more or less throttling position. Furthermore, each throttle valve 9 includes an electromagnetically operable locking member 12 which permits locking of the respective throttle valve 9 in a position in which passage of hydraulic fluid is blocked.

The control members 10 and the locking members 12 have driver circuits 13 and 14 associated therewith which are controlled by way of electronic control circuits 15 and 16. During normal vehicle operation only the control circuit 15 is operative and it operates in such a way that, depending on predetermined parameters and parameters established by respective sensors, the driver circuit 13 is so controlled that the throttle valves 9 provide for a more or less intense throttling action.

If a vehicle is parked and locked the control circuit 16 activates the driver circuit 13 so as to close the throttle valves 9. In their closed position, the throttle valves 9 are then locked by their locking members 12 which are actuated to this end by the driver circuits 14 also under the control of the control circuit 16.

This activity results in the operation of the power steering as will be explained below on the basis of FIG. 1:

During normal vehicle operation the servo valve 4 is controlled, in a basically well known manner, dependent on the steering forces effective between a steering wheel and the steered vehicle wheels which are not shown. As long as the steering forces are small, the servo valve 4 remains in its center position as shown in FIG. 1 wherein the two motor connections of the servo valve are interconnected and are in communication with the reservoir 6. Besides, with a so-called open center of the servo valve 4, there may be—as shown in FIG. 1—a flow connection with the pump 5. However, the pump connection may be closed in the center position of the servo valve 4 if the servo valve has a so-called closed center.

As soon as the steering forces exceed a certain threshold value the servo valve is moved out of its center position in one or the opposite direction to a certain degree with the result that a certain pressure difference is generated which is also effective on the opposite sides of the piston cylinder unit 1 and which provides for a steering force supporting a desired steering maneuver.

Independent of the position of the servo valve 4, the throttle valves 9 may be in various throttling positions depending on certain parameters. This results in a controllable dampening of the steering mechanism since the piston of the piston-cylinder unit 1 can be displaced by external forces effective on the steered vehicle wheels only against the controllable throttling resistance of the valves 9. In addition, by adjustment of the throttle valves 9 also the steering forces required at the steering wheel can be changed. For example, the steering mechanism can be made somewhat harder to operate at higher vehicle speeds.

As the vehicle is parked, first one of the throttle valves assumes a closed position with the result that the piston-cylinder unit 1 and, consequently, the vehicle steering system is blocked so that no steering movement can be effected by which the hydraulic fluid has to move the piston cylinder unit 1 in the direction toward the blocked throttle valve 9. As a result, the steering wheel locking mechanism commonly used in motor vehicles can be eliminated as the vehicle wheels are hydraulically locked in a given position.

What is claimed is:

1. A hydraulic power steering for a motor vehicle, comprising: a hydraulic servo motor having opposite hydraulic actuating chambers, a servo valve arrangement in communication with said opposite hydraulic actuating chambers by separate communication conduits by which the opposite hydraulic actuating chambers can be placed selectively in communication with a pressurized fluid source or a low pressure fluid line for generating a controllable pressure differential between said hydraulic actuating chambers for operating said servo motor with a force which depends on a steering force applied by a vehicle operator to a vehicle steering wheel, and a valve arrangement disposed in a communication conduit between said servo motor and said servo valve and permitting when open the release of hydraulic fluid from one of said actuating chamber but blocking the release of hydraulic fluid when closed while the motor vehicle is parked, thereby hydraulically locking said power steering.

2. A power steering according to claim 1, wherein flow blocking valve arrangements are disposed in both said communication conduits.

3. A power steering according to claim 1, wherein controllable throttling valves are arranged in both said communication conduits extending between the opposite hydraulic actuating chambers and said servo valve.

4. A power steering according to claim 1, wherein said communication conduits extending between said opposite hydraulic actuating chambers and the respective servo valve connections include check valves permitting fluid flow only toward said servo-motor and, in parallel to said check valves, controllable valves and further, in additional parallel flow arrangements, pressure limiting valves.

5. A power steering according to claim 4, wherein said controllable valves are controllable throttle valves.

6. A power steering according to claim 4, wherein said pressure limiting valves arranged in additional flow conduits extending parallel to said check valves.

7. A power steering according to claim 1, wherein said servo motor is a double-acting piston and cylinder unit having said actuating chambers at opposite sides of said piston.

* * * * *